United States Patent
Lieckfeldt

(10) Patent No.: US 8,705,843 B2
(45) Date of Patent: Apr. 22, 2014

(54) METHOD FOR TEXTURIZING VIRTUAL THREE-DIMENSIONAL OBJECTS

(75) Inventor: Peter Lieckfeldt, Neustrelitz (DE)

(73) Assignee: GTA Geoinformatik GmbH, Neubrandenburg (DE)

( * ) Notice: Subject to any disclaimer, the term of this patent is extended or adjusted under 35 U.S.C. 154(b) by 649 days.

(21) Appl. No.: 12/311,684

(22) PCT Filed: Oct. 10, 2007

(86) PCT No.: PCT/EP2007/008825
§ 371 (c)(1),
(2), (4) Date: Feb. 12, 2010

(87) PCT Pub. No.: WO2008/043550
PCT Pub. Date: Apr. 17, 2008

(65) Prior Publication Data
US 2010/0202682 A1 Aug. 12, 2010

(30) Foreign Application Priority Data

Oct. 11, 2006 (DE) .......................... 10 2006 048 241
Jul. 3, 2007 (DE) .......................... 10 2007 030 781

(51) Int. Cl.
*G06K 9/00* (2006.01)

(52) U.S. Cl.
USPC ........... 382/154; 382/285; 382/181; 382/294; 382/162

(58) Field of Classification Search
USPC .......................... 382/154, 162, 285, 181, 294
See application file for complete search history.

(56) References Cited

U.S. PATENT DOCUMENTS

2005/0128212 A1  6/2005  Edecker et al. ............... 345/582

FOREIGN PATENT DOCUMENTS

| DE | 19920709 | 11/2000 | ............. G06T 17/50 |
| JP | 11120374 | 4/1999 | ............. G06T 15/00 |
| WO | WO 02/19273 | 3/2002 | ............. G06T 15/20 |

OTHER PUBLICATIONS

Kada et al: "Facade Texturing for Rendering 3D City Models", ASPRS 2005 Annual Conference, Mar. 7-11, 2005.*

(Continued)

*Primary Examiner* — Ruiping Li
(74) *Attorney, Agent, or Firm* — Sunstein Kann Murphy & Timbers LLP

(57) ABSTRACT

The invention relates to a method for texturizing virtual three-dimensional objects, particularly virtual three-dimensional building objects and city models with a photographic image (1) of a real object, particularly of a picture of a façade. The method is characterized by the following steps: Projecting the photographic image (1) onto a virtual surface (2) of the virtual three-dimensional object to produce a raw texture; localizing a raw texture element (3) in the raw texture by using a classification method; computer-compatible description of the localized raw texture element by a formal feature set for the raw texture element, particularly a feature vector; comparing the formal feature set of the raw texture element with each feature set of predefined library elements (4), and determining degrees of similarity between the raw texture element and each library element; replacing the localized raw texture element with at least one library element when a predefined degree of similarity is present, and reshaping the raw texture into a generalized texture (5) of the virtual object by replacing all raw texture elements with library elements.

19 Claims, 7 Drawing Sheets

(56) References Cited

OTHER PUBLICATIONS

Frueh et al: "Automated Texture Mapping of 3D City Models With Oblique Aerial Imagery", Proceedings of the 2nd International Symposium on 3D Data Processing, Visualization, and Transmission, 2004.*

Bekins, et al., *Build-by-Number: Rearranging the Real World to Visualize Novel Architectural Spaces*; Visualization, IEEE Minneapolis, MN, Oct. 23, 2005, pp. 143-150; XP010853156.

Vande Velde Linde, "*Tele Atlas 3d navigable maps*"; Workshop on Next Generation Internet, XX, Jun. 21, 2005, pp. 47-50; XP002449676.

Notification of Transmittal of Translation of the International Preliminary Report on Patentability; International Preliminary Report on Patentability; English translation of Written Opinion of the International Searching Authority.

* cited by examiner

METHOD FOR TEXTURIZING VIRTUAL THREE-DIMENSIONAL OBJECTS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION (1) Field of the Invention

The invention relates to a method for texturing virtual three-dimensional objects, particularly virtual three-dimensional building objects and city models.

(2) Description of Related Art

With respect to a graphical representation of a virtual three-dimensional object generated by a computer, the texture or texturing, respectively, is the image displayed on the surface of the three-dimensional object. In a digital textured 3D modeling used for the planning of buildings or cities, for example, façade surfaces are displayed on the surface of the objects, which represent views of the façades of real objects, i.e. real houses or other buildings, with a certain recognition value.

For texturings of this type, two methods are currently available. In a first method, a photorealistic texturing is performed. A photographic image of the surface of the real object is projected onto the surface of the virtual object. As a rule, picture editing methods are used for this purpose. In such a method, many details of the real object are reproduced due to the use of real image data, so that the virtual three-dimensional object allows a high informative content.

However, this method requires a high image quality of the photographic source material, which may not be guaranteed from the beginning and, depending on the image material, may be difficult to correct subsequently. In general, such a texturing also requires a high degree of manual processing work, during which the textures of the virtual objects are checked for correctness one by one and the real photographic image data have to be adapted to the virtual object, especially scaled and, if necessary, freed from faults. Due to the use of real image data the generated virtual objects require a great data volume, and even if the representation of the object is scaled down, all image information of the original image material have to be stored together with the virtual object.

As an alternative, also a generic texturing may be applied. The graphical elements are positioned on the surface of the virtual object in the form of a schematic representation of the real object, so that the entire surface of the virtual model is generated artificially. Such a representation reproduces fewer details of the real object. The so achieved informative content is much smaller than that of a photorealistic representation. It is, however, an advantage of such a method that already prefabricated graphical elements are used according to the modular design principle, so that a high degree of automation can be achieved. Also, the generated virtual objects are significantly smaller as far as their data volumes are concerned as compared to the photorealistically textured 3D objects.

In the practical use of virtual 3D objects, where it should, on the one hand, be possible to reproduce and process the three-dimensional model with as many details as possible while keeping the storage capacity low, it shows very frequently that there is no practicable method to ensure a great richness of details for the 3D objects on the one hand, and a low data volume on the other hand. In many cases, the optimum reproduction of a real object in the virtual model is exactly at a point somewhere between the photorealistic and the generic representation, a virtual object need not reproduce all details of the real object, but the purely generic representation of the object is too rough and short of details.

Also, both texturing methods require in many cases a very considerable manual expenditure. Depending on the complexity of the object in the specific case, the texturing may constitute up to 60% of the overall expenditure of a project. In typical projects, where three-dimensional city models are generated on the computer, currently—despite highly effective individual solutions in some cases—a great amount of work has to be accomplished manually, so that thousands of man hours of highly specialized technical personnel may be necessary.

OBJECTS AND SUMMARY OF THE INVENTION

Therefore, it is the object to provide a method, by means of which the time expenditure needed for the texturing can be reduced significantly by an extensive automation, so that the cost efficiency and, last but not least, also the competitiveness can be improved considerably. Specifically, the operator is to be relieved from the time-consuming and wearisome activity entailed by transforming the object views into the texture of the three-dimensional objects.

Moreover, it is the object to make the use of oblique aerial photographs, which are obtained as air photographs, available to large-scale projects by automated procedures, and to combine the effective acquisition of real object surfaces and real textures with a possibly fast and effective transformation into textures for virtual three-dimensional objects.

Finally, it is the object to provide a method for texturing virtual three-dimensional objects, in which the texture of the virtual object corresponds with sufficient exactness to the photorealistic representation, while the storage capacity of the virtual object is reduced to a maximum and approximately corresponds to the generic texturing. Specifically, the texturing method is to guarantee that the characteristic properties of the represented objects, which are visible in the photorealistic representation, are reproduced on the virtual object to a greatest possible extent or as completely as possible, although the virtual object has a substantially generic surface. Specifically, the method is to allow that the picture of the real object can be transferred into the generic representation as individually as possible and with a maximum of automation.

The objects are achieved with a method for texturing virtual three-dimensional objects, particularly virtual three-dimensional building objects and city objects, with a photographic image of a real object, particularly a picture of a façade. The method is characterized by the following inventive method steps:

In a first step, the photographic image is projected onto the corresponding surface of the virtual three-dimensional object to generate a raw texture.

Within the raw texture, a raw texture element is localized by using a classification method. The localized raw texture element is described in a computerized manner by a formal attribute set, particularly an attribute vector.

The formal attribute set of the raw texture element is compared with an attribute set of predetermined library elements, and similarity measures between the raw texture element and a library element are determined.

The localized raw texture element is now replaced by a library element, which has a similarity measure of a defined size and/or quantity. In connection therewith, finally the raw texture is transformed into a generalized texture of the virtual object by replacing all raw texture elements by library elements.

Thus, the method according to the invention is based on the idea to collect at first possibly all structure-forming elements on a photorealistic texture, i.e. the raw texture elements which substantially define the appearance of the texture. This includes, for example, the shape and color of the façade and the plaster, especially decorative elements on the façade, windows and rows of windows, doors, balconies and the like shapes and structures, which are recognizable in a photorealistic image of the real object. Thus, this step represents the detection and localization of the respective raw texture element.

This localization is combined with a classification method, whereby the characteristics of the raw texture element, e.g. color, shape, size, location and position are captured in the photograph image and are stored.

The so detected characteristics form a formal set of attributes or an attribute vector, respectively, by means of which a raw texture element can uniquely and comparably be defined, detected and edited for a subsequent data processing.

This formal set of attributes is now compared with attribute sets of predetermined library elements. It may also be used for the construction of library elements.

The library elements are picture components or picture elements, from which a generalized texture can be assembled. The comparison between the formal attribute set and the attribute set of the library element is intended to find a suited library element by which the raw texture element can be replaced. To this end, a similarity measure between the formal attribute set of the raw texture element and the attribute set of the library element is determined.

Provided that the similarity measure corresponds to a predefined value, e.g. a maximum, a threshold or a defined tolerance range, the raw texture element is now replaced by the respective library element. Now, the library element appears in the texture at the place of the previous raw texture element.

By replacing additional raw texture elements by corresponding library elements, thus, a generalized texture is generated from the total original raw texture. This means that the generalized texture is built up on the basis of the identified details of the raw texture. As a result of the comparison between the raw texture element and the library element it shows a greatest possible similarity to the raw texture, with a great and defined degree of detail. However, due to the generic basic structure its data volume is minimal. The capturing of the raw texture elements, the attribute classification thereof and the comparison of their attributes with the attributes of the library elements is formalized and automated, the insertion of the library elements is accomplished by image processing steps, which are likewise automated. Thus, the generation of the generalized texture is largely automatic.

The photographic image for generating the raw texture may derive from various sources. Particularly advantageous is the use of a georeferenced terrestrial digital photograph, where the location and the direction of the shot can be uniquely identified in the terrestrial coordinate system. Also, such a photograph is already available in a digital form.

Another advantageous source for the projected photographic image is an air photograph, particularly a nadir or an oblique aerial photograph.

Expediently, image processing steps are carried out to improve the image by removing faults in the raw texture, specifically a reduction and/or elimination of disadvantageous shadow edges and a deblurring and/or improving the definition. Thus, it is avoided that artefacts, which exclusively result, for example, from exposure conditions during the shooting of the image data, are treated as raw texture elements in the further course of the procedure.

The classification method for localizing the raw texture element includes a detection of position, shape, color, surfaces and/or edges according to previously defined search parameters, whereby the localized raw texture element is selected at least in view of its position in the raw texture, its shape, color and/or edge structure and the like attributes.

Such a procedure entails, for example, that doors or windows on a façade are detected and are identified to be different from other façade elements, such as stucco strips or downpipes, due to their rectangular shape. Moreover, structures such as window crosses and skylights are additionally identified. The so detected object is identified, for example, as a window, especially as a window with a skylight or window cross, respectively.

Usefully, scalable attributes of the raw texture element, particularly the height and width and/or picture element numbers of the raw texture element, are rescaled to a normalized reference quantity. This reference quantity then forms a part of the formal attribute set of the raw texture element. Such an approach reduces the library elements which might be necessary for the exchange of a raw texture element. Thus, it is particularly possible to provide substantially only one library element for a number of windows that have an invariable height/width ratio, even when being rescaled. The normalized reference quantity now makes it possible to perform a very simple comparison between the raw texture element and the library element and to test the correspondence of both elements in an uncomplicated manner.

Scaling-independent attributes of the raw texture element, particularly color values, represent a predominantly absolute reference quantity in the formal attribute set of the raw texture element. However, a color scaling for differently illuminated parts of the façades is possible, for example, to represent effects of light and shadows. One example for this is a façade color tone which does not experience any change even if the size of the façade is scaled. Such an attribute can only adopt an absolute value and, therefore, can be compared in absolute terms only.

The comparison of the formal attribute set of the raw texture element with the attribute set of a library element includes a comparison of the normalized reference quantities, with a similarity test being carried out between a first normalized reference quantity and a second normalized reference quantity.

In this test it is proceeded from the fact that ratios of sizes remain invariant in similarity representations. Accordingly, a raw texture element and a library element are similar if this test entails a positive result. The library element can, in this case, be transferred into the raw texture element by a similarity transformation, thereby overlapping with its shape the image area of the raw texture element.

The comparison of the formal attribute set of the raw texture element with the attribute set of the library element further includes a comparison of the absolute reference quantities, whereby a test for a greatest possible correspondence of the absolute reference quantities is carried out.

This test substantially detects the degree of correspondence between absolute quantities, e.g. color values. It is a direct comparison between characteristics of the raw texture element and the library element, wherein an adaptation of the next best available variant of the library element to the raw texture element is, in principle, possible by correspondingly varying the respective absolute quantity of the library element.

In the determination of the similarity measure between the formal attribute set of the raw texture element and the attribute set of the library element a degree of correspondence of the absolute reference quantities and/or a stability of the invariant ratios is determined. The greatest similarity measure between the raw texture element and the library element is obtained if the absolute reference quantities correspond to each other sufficiently well in an optionally narrow tolerance range and the ratios between the normalized reference quantities are as stable as possible.

In an expedient embodiment the similarity measure is defined in advance. All library elements are here outputted as selection alternatives with a similarity measure lying within a tolerance range to act as possible replacements for the raw texture element, sorted according to the similarity value.

The replacement of the raw texture element by the library element is accomplished by cutting the point set of the raw texture element out of the raw texture and inserting the point set of the library element into the raw texture. Basically, a cut-out/insert method known as cut and copy is carried out, where as many areas of the raw texture as possible are replaced by library elements so as to transfer the raw texture into the generalized texture as completely as possible.

This replacement procedure expediently includes a manual postprocessing, allowing possibly required corrections to be made.

In practice, this is accomplished by inserting sections, that are not classified in the raw texture, into the generalized texture, expediently as pixel groups, specifically bitmaps. These non-classified areas, e.g. ornaments having a complicated shape, then represent an image component subsequently inserted into the generalized texture.

To achieve an economical use of process capacities, especially of storage resources and computation time, an at least partial tiling of the virtual object with a periodic sequence of a library element adapted to a raw texture element can be performed when the raw texture is transformed into the generalized texture, whereby library elements are substantially adapted only for one location of the raw texture, with these adapted elements being joined in a tile-like manner and covering the virtual object.

The method according to the invention shall be explained in more detail by means of an embodiment in connection with FIGS. 1 to 8. Like reference numbers shall be used for like or equally acting method steps and components.

BRIEF DESCRIPTION OF THE DRAWINGS

In the figures.

DETAILED DESCRIPTION OF THE PREFERRED EMBODIMENTS

Figure 1:
FIG. 1 shows an exemplary terrestrial photograph of a house façade in a black and white coding.
Figure 2:
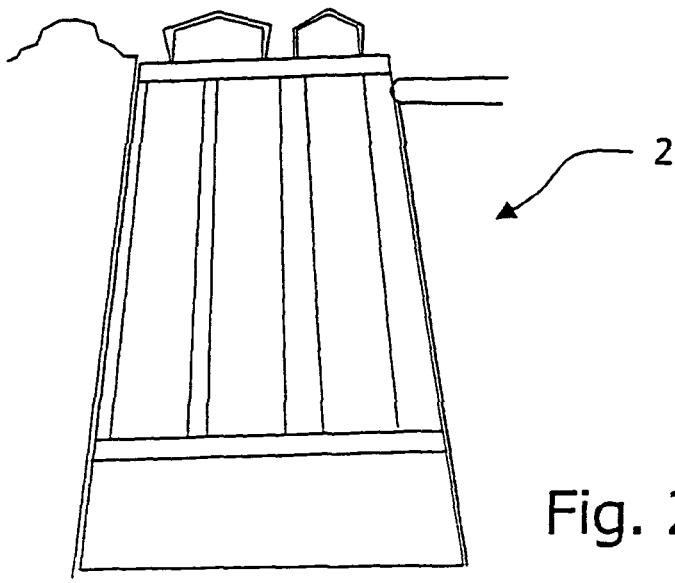
FIG. 2 shows a virtual three-dimensional object generated for the house façade of FIG. 1, in a view corresponding to the photograph of FIG. 1.

FIG. 1 shows a façade picture 1, and FIG. 2 shows the pertinent surface of the correspondingly generated virtual three-dimensional object 2 in a perspective corresponding to the picture of FIG. 1. The façade picture shown in FIG. 1 has been generated in the form of a terrestrial digital photograph. Expediently, the terrestrial image is georeferenced. This means that the location of the photographic device in the coordinate system of the earth and the orientation thereof with respect to the coordinate axes at the shooting location is uniquely known.

Instead of the terrestrial photograph, also oblique or nadir aerial photographs can be used. The virtual three-dimensional object shown in FIG. 2 is a contour abstracted from the real object, i.e. the façade or the pertinent house, the boundaries of which reproduce the body boundaries of the real object at a reduced scale with sufficient exactness. Specifically, the virtual contour must be exact enough to allow the insertion of the captured façade picture on the corresponding rim of the virtual object true to size and free of distortion.

The comparison of the representations shown in FIG. 1 and FIG. 2 shows that building shapes and contours, such as dormers or also continuous façade lines, may be used as references and reference points for the adaptation of the façade picture to the rim of the virtual three-dimensional object.

Figure 3:
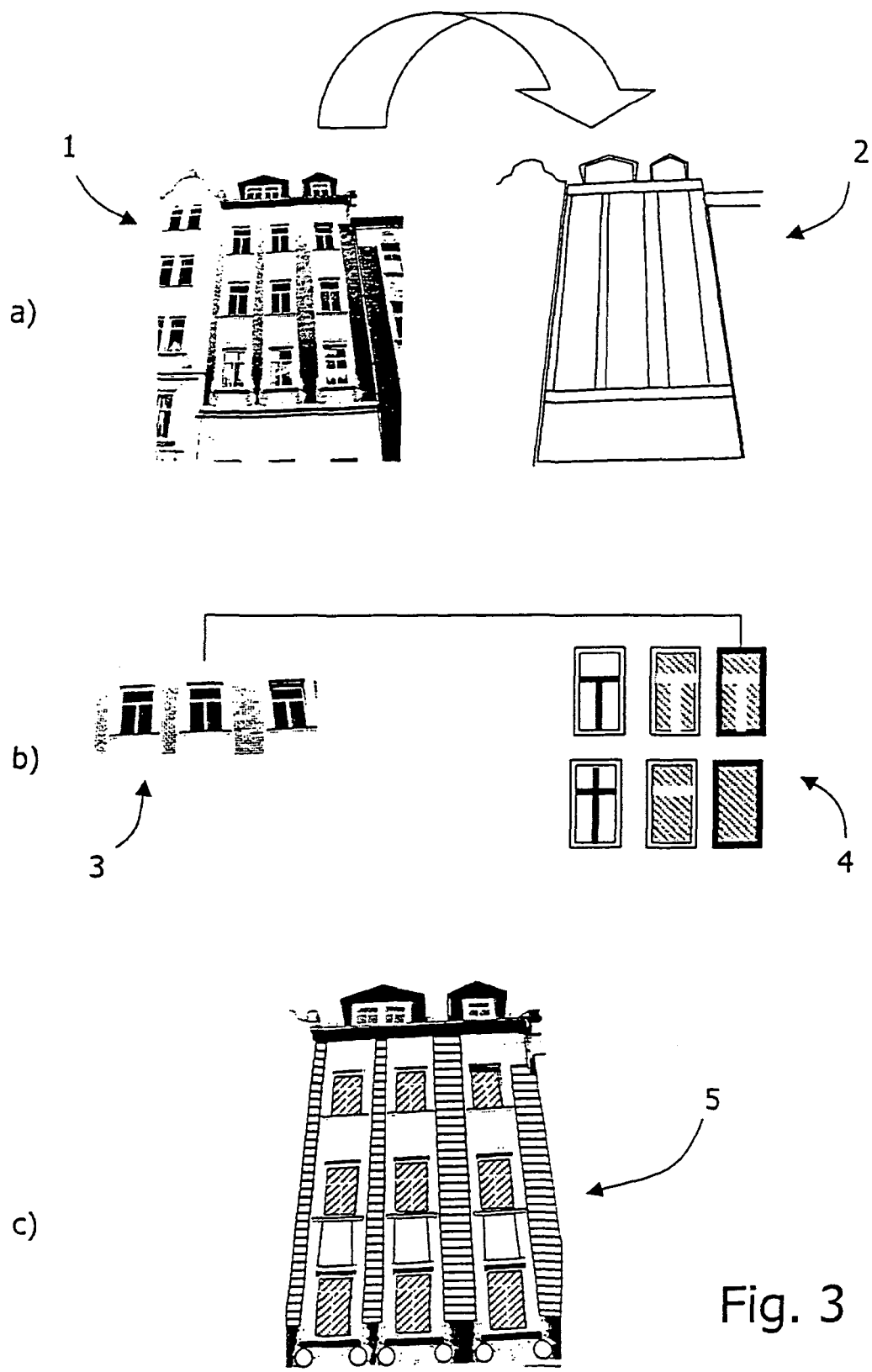
FIG. 3 shows basic method steps in a general representation.

FIG. 3 shows basic method steps of the method according to the invention. In a method step a, the façade picture 1 is applied as texture onto the virtual three-dimensional object, onto a surface provided therefor. This texture will be referred to as raw texture below. To generate the raw texture, software modules already provided for this purpose may by used, which are normally used for generating photorealistic textures. Thus, the generation of the raw texture is substantially accomplished fully automatically.

Immediately after the generation of the raw texture, or already prior to the generation thereof, an image processing may be carried out on the set of the picture elements of the façade picture so as to improve the image quality and prepare the structure recognitions. This concerns above all shadow shapes and disturbing edge structures caused by the same on the image data. To this end, above all a deblurring of the edges may be performed, or their definition may be improved.

It is particularly advantageous and, as a rule, necessary for a subsequent identification of raw texture elements to transform an originally colored façade picture into a façade picture in the form of a copy in a gray tone or black and white mode. After such a color transformation, windows and window crosses stand out against a lighter façade background by very distinct black surfaces intersected by light lines, which can be seen in the figures. Such a transformation is also advantageous if the structure of façade designs with different colors is to be identified. In the example of FIG. 3, particularly the strip-shaped clinker elements are well identifiable as a result of transforming the image into the black and white mode.

However, during a reduction to a black and white image representation many information get lost because a great amount of different color values are mapped to only a few b/w values, whereby the thresholds for the allocation between the color range and the black and white range are chosen more or less arbitrarily. This problem can be avoided by using a classificator capable of analyzing colors. It allows the detectability of the raw texture elements in respect of their contour, with an allocation of library elements if different colors are concerned.

In a step b, the classification method is applied to the so generated raw texture, whereby special raw texture elements 3, e.g. window structures or other façade elements such as balconies, doors, stucco etc., are localized on the raw texture on the one hand, and are compared with previously stored library elements 4 on the other hand. In the example shown, the raw texture elements are formed as windows, which have a typical rectangular shape with a certain ratio between height and width and typical shapes of window crosses, and which moreover show a typical color or contrast effect. As library elements 4 image elements are available, to which the captured raw texture elements are compared in respect of their attributes. The localization of the raw texture elements, the description thereof and the comparison thereof with the library elements forms the classification method step. The conclusion thereof is the selection of a library element which reproduces the characteristics of the raw texture element with a particularly great similarity. A detailed explanation of the classification shall be given below.

By using the library elements, the entire raw texture is transformed to a generalized texture 5 in a final step c, whereby all classified raw texture elements, i.e. windows and other structures on the façade, are replaced by library elements and the generic texture is assembled according to the modular design principle. In the example shown in FIG. 3, all windows from the raw structure and the clinker structures extending over the façade as vertical strips are replaced by the corresponding library elements.

The classification of exemplary raw texture elements shall be explained in more detail below.

Figure 4:
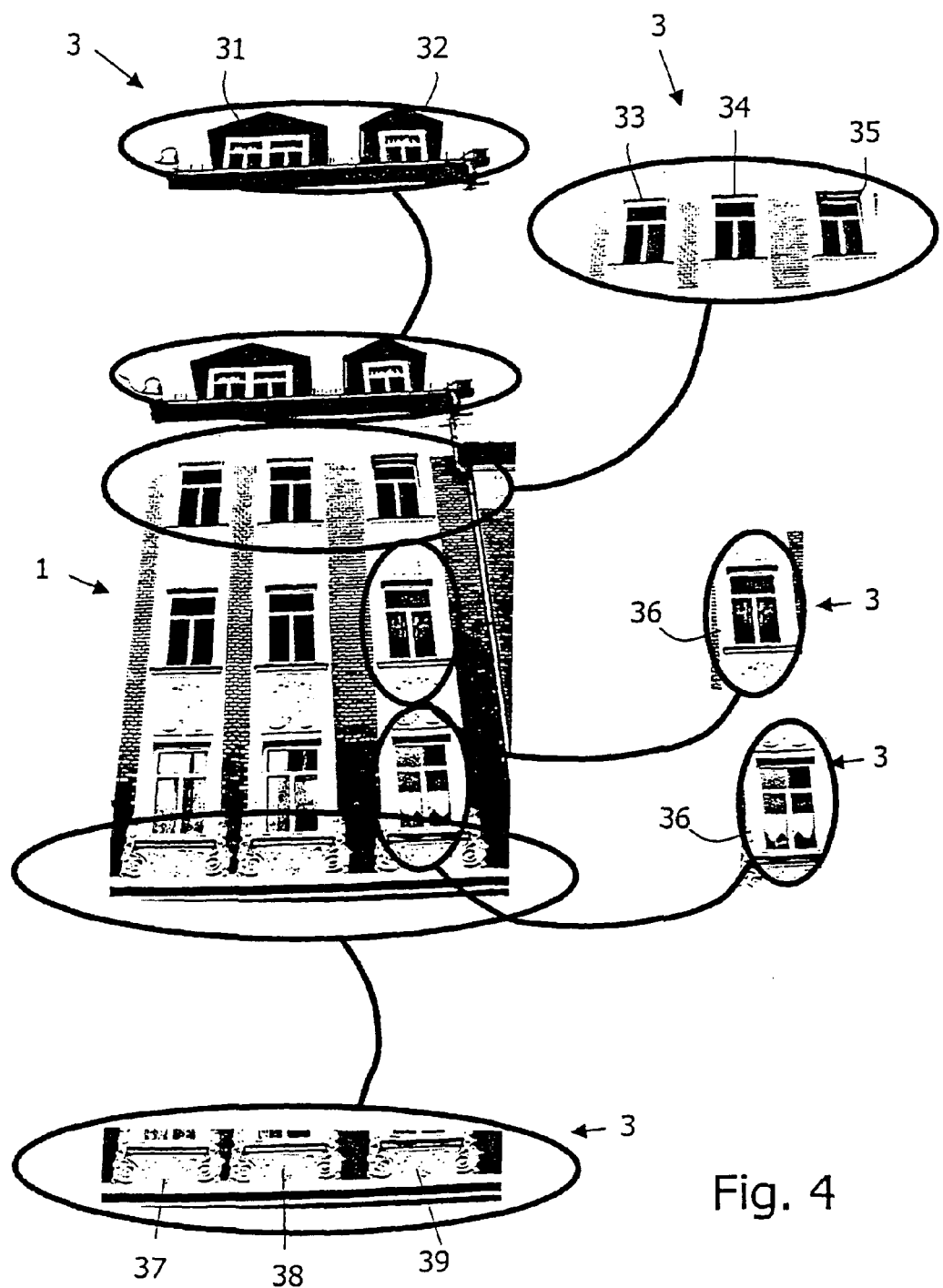
FIG. 4 shows exemplary raw texture elements on the previously shown façade picture.

FIG. 4 shows some exemplary raw texture elements, especially windows and stucco elements. The exemplary façade picture comprises two different dormer windows 31 and 32. In this example, dormer window 31 consists of two single windows located closely adjacent to each other. Dormer window 32 is a single window with a T-shaped window cross. Window 31 and window 32 both stand clearly out against the background with their white frames.

In this example, windows 33, 34 and 35 substantially have black shapes, broken by a white T-shaped window cross, which clearly stand out against the substantially white background of the façade. The shape of window 36 corresponds substantially to that of windows 33 to 35, but is influenced by an object located behind the panes, which affects the black pane surfaces and makes them appear inhomogeneous. This effect is more clearly shown in another window 36, where a curtain affects the black structure of the pane and nearly renders the design of the window cross irrecognizable.

Finally, stucco elements 37, 38 and 39 are provided, which may be considered as additional raw texture elements and the contour of which is indistinct against the background of the façade.

The raw texture elements 31 and 32 or 33 to 35, respectively, can be localized on the black-and-white-coded picture by a shape recognition. To this end, the picture elements of the raw texture are evaluated, wherein the areas of the black panes standing out against the white surroundings and the shape of the window crosses are read out by a software. Above all, the rectangular shape of the black window contours and the regular arrangement thereof with respect to each other are identified. In this image recognition, the white window crosses form white sets of picture elements arranged in strips of a well-defined width and length, which are inserted between the rectangular black surfaces of the window panes. The picture element set formed of white strips and black surfaces, together with the position thereof in the picture, is then identified as a raw texture element and read out.

To search for and identify windows, particularly window distributions assumed a priori are used on the façade surface. Thus, if the façade surface has a height of 15 m, it is assumed that the represented building has four floors each with a height of 3.75 m. Based on these starting parameters a search for four rows of windows at a corresponding distance is proposed and possibly executed. It shows that such a proposal automatism shows surprisingly good results.

Inhomogeneities such as in connection with the window structure 36 can usually be removed or suppressed by an image processing, which precedes the localization of the raw texture elements. To this end, on principle several image processings are possible. Specifically, inhomogeneities can be removed by color-coding the façade picture in an expedient manner. Regular structures such as window frames and window crosses thus stand out due to their uniform coloring and are then easier to identify for the structure recognition. The black and white coding shown in the figure is particularly advantageous if regular structures are to be localized on a light façade. As a rule, when processing the images in such a way, the correspondingly recoded image is then used as a copy for the structure recognition.

The stucco elements 37 and 39 are characterized by irregular and complicated structures, which clearly stand out against the unstructured and white façade, however. Such areas can be read out either as surfaces with a certain average gray tone, or these image areas can be cut out in the form of a bitmap. Corresponding method steps shall be explained in more detail below.

Figure 5:
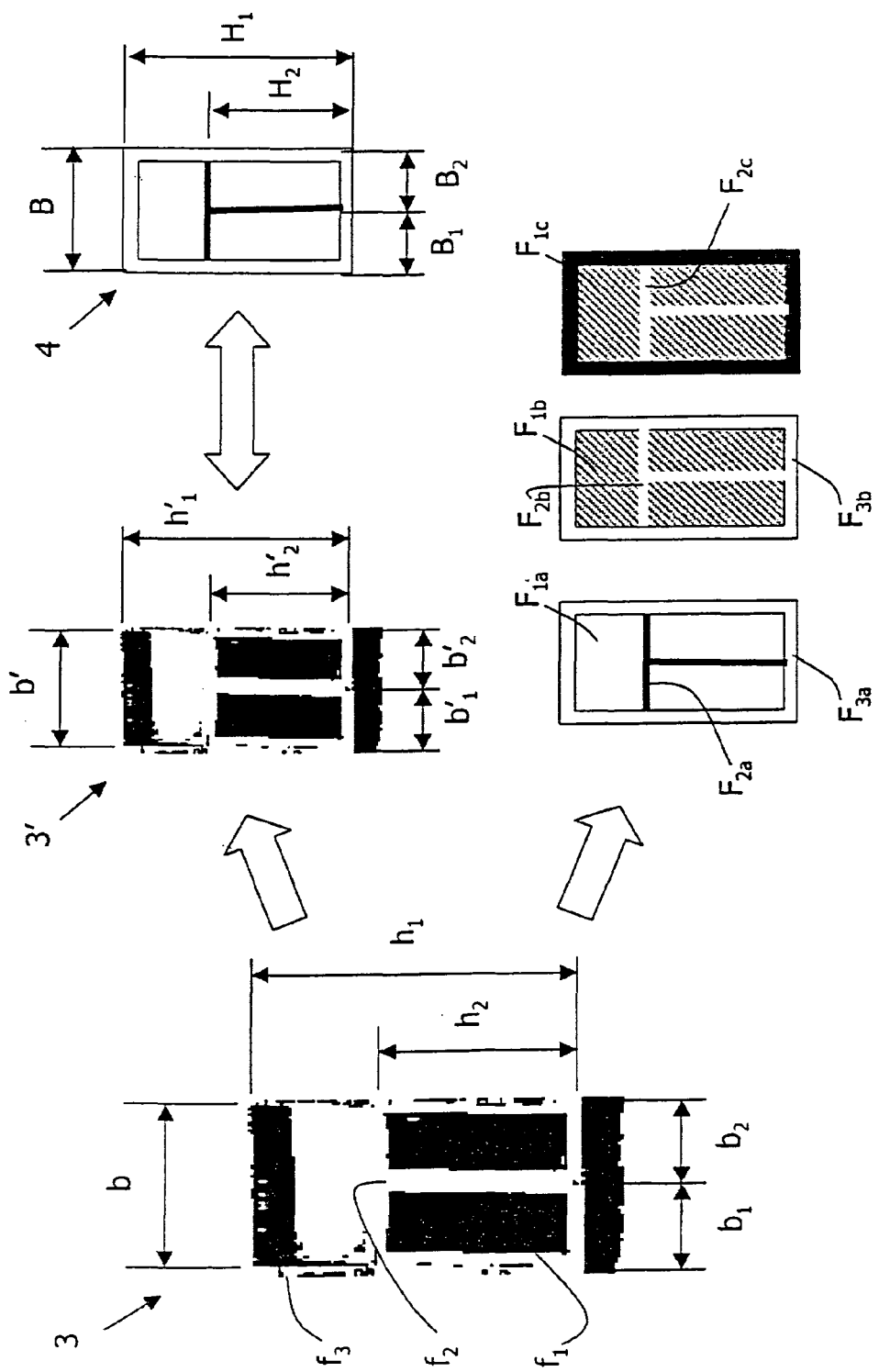
FIG. 5 shows scalings and comparisons of attribute sets between the raw texture element and the library element by the example of a window and a window cross.

FIG. 5 shows an example of the classification method used for a window cross. The figure shows a raw texture element obtained by the image recognition on the left. In order to classify the raw texture element, the set of picture elements determined in the image recognition has to be compared with a library element 4. To this end, a structure comparison, a size comparison and a color comparison are substantially performed, for which purpose attribute sets between the raw texture element and the library element are compared.

The size of the raw texture element plays a significant role in the attribute set thereof. Of importance is, in this case, not primarily the absolute size of the raw texture element, however, because it varies with each scaling action and can, therefore, not be compared with an absolute size of a library element. It is rather checked when comparing the size of the raw texture element with that of the library element whether the dimensions comply with the geometric laws for similarity transformations.

FIG. 5 shows, for example, a raw texture element 3 with a width b and a height $h_1$. Moreover, the raw texture element comprises a window cross, the transverse beam of which is located at a height $h_2$, while the vertical beam of the window cross divides the width of the raw texture element at a foot ratio $b_1/b_2$. It may be assumed that a raw texture element and an optional library element correspond to each other with respect to their shapes if the ratio of sizes of optional sections in the raw texture element and the library element, respectively, coincide. On this condition, a library element can be scaled to the shape of the raw texture element by means of the similarity transformation.

Advantageously, ratios of sizes for an attribute set of the raw texture element are now determined. In the example of FIG. 5, above all, the ratio of sizes between width and height $b/h_1=v_1$, the ratio between the height of the transverse beam and the total height $h_2/h_1=v_2$ and the foot ratio $b_1/b_2=v_3$ offer themselves.

Moreover, color information of individual image areas of the raw texture element are read out from the image data of the raw texture. In the example shown, especially the colors $f_1$ and $f_2$ of the window surfaces and the window cross or the color $f_3$ of the window frame are significant. The exemplary attribute set of the raw texture element can then be represented as a formal attribute vector, which completely describes the raw texture element.

$$m=(v_1;v_2;v_3;f_1;f_2;f_3)$$

The values of the attribute vector m remain unchanged even if the raw texture element is scaled. In the raw texture element 3', for example, the ratios $v_1$ to $v_3$ and $f_1$ to $f_3$ remain constant, although the dimensions of the raw texture element now being smaller have adopted other values.

FIG. 5 shows in contrast thereto a library element 4 to which, in analogy to the characteristic values defined in relation to the raw texture element, a comparable attribute vector is allocated from the very beginning. The ratio of width and height $B/H_1=V_1$, the ratio of the height of the transverse beam to the total height $H_2/H_1=V_2$ and the foot ratio $B_1/B_2=V_3$ of the library element as well as the color values $F_1, F_2, F_3$ of the color areas of the library element are defined in exactly the same manner and are combined to an attribute vector M of the library element:

$$M=(V_1;V_2;V_3;F_1;F_2;F_3)$$

For the classification, the attribute vector m of the raw texture element is compared to the attribute vector of the library element component by component, whereby a similarity measure between both vectors is determined. The tolerances for the deviations of the individual values in the comparison may be predefined and basically be varied as desired. Advantageously, the tolerance ranges for the deviations of the ratios $v_n$ and $V_n$ in both vectors are chosen to be tighter and the deviation tolerances for the deviations of the color values are chosen to be greater. A correct reproduction of the size or the ratios of sizes of the raw texture element by the library element is, accordingly, more important than a correct color reproduction. Of course, such preferences can be selected differently according to the requirement.

As to the color values $f_n$ and $F_n$, the standard color systems for image processing programs, specifically the RGB or CMYK systems, may be used. In the example shown in FIG. 5, three library elements are available for selection, each of which have color values $F_{1a}, F_{2a}, F_{3a}; F_{1b}, F_{2b}, F_{3b}$, and $F_{1c}, F_{2c}, F_{3c}$. The finally chosen library element corresponds, in the example shown, to the library element with the colors $F_{1b}, F_{2b}, F_{3b}$. Thus, the raw texture element is classified with respect to its color as well as its size.

Figure 6:
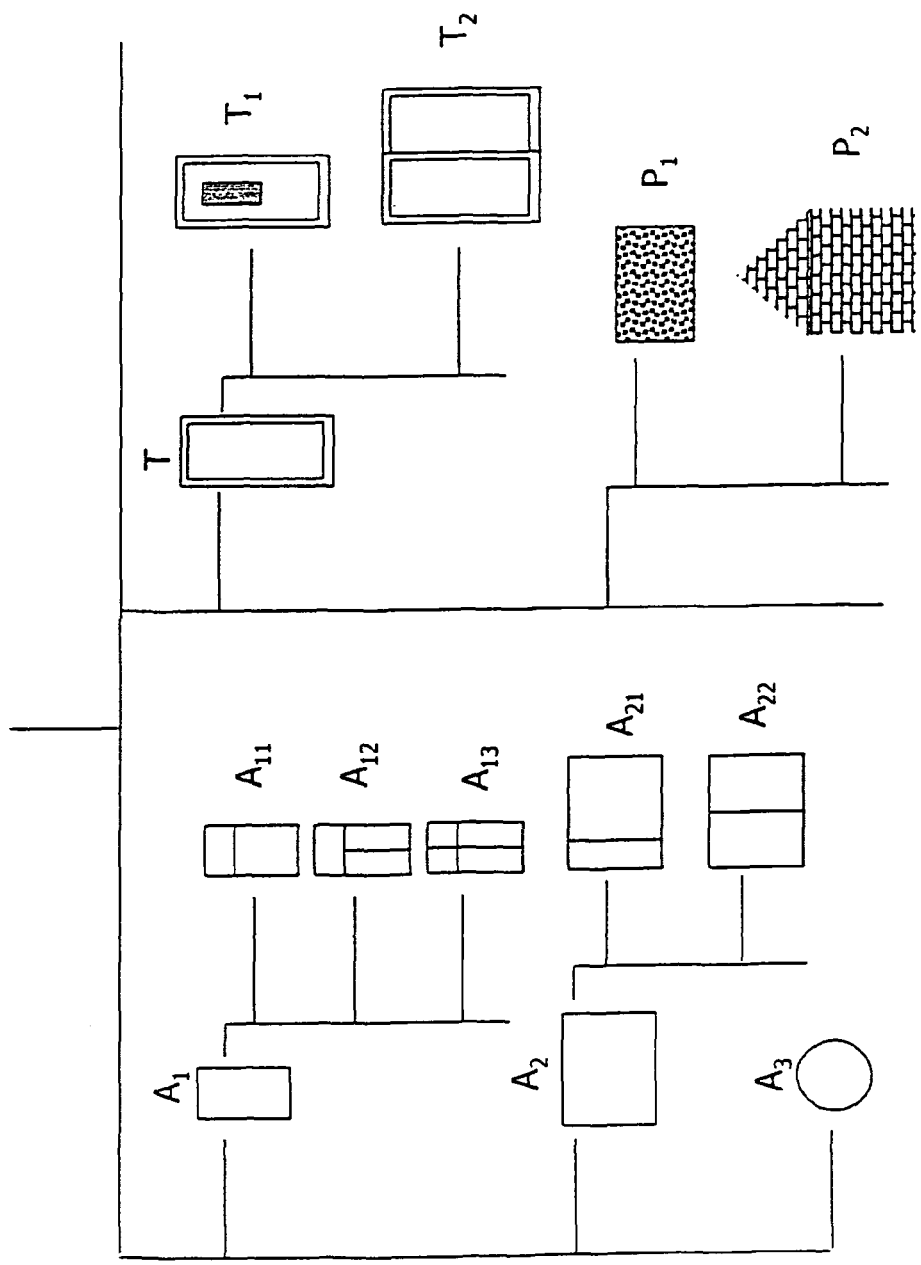
FIG. 6 shows an exemplary tree structure for some library elements.

FIG. 6 shows an exemplary and strongly simplified tree structure for the management of library elements. The library elements in this embodiment are primarily organized according to functional criteria. For example, library elements for windows, doors, façade surfaces etc. are contained. Basically, it is also possible to organize library elements according to other criteria, particularly purely graphical ones. In this case, the tree would include a branch for rectangular, circular, elliptical and the like other library elements, regardless of their functional references. Such an alternative tree structure would insofar be more advantageous as the raw texture elements are localized by the image processing mainly by means of the shape.

Moreover, also two tree structures may be provided as a combination, with the library elements being simultaneously managed in both ways.

The classification of the library elements according to their function does have certain advantages, however. Specifically, a user can predefine in advance that raw texture elements, which are captured within a specific predetermined image section in the raw texture, are treated exclusively as a window or exclusively as a door or the like element, respectively. In a way, this allows a faster classification of the raw texture elements because, for example, a raw texture element having a T-shaped image structure, which is not in the proximity of the lower image edge, refers to a window. In this case, in order to find the correct library element, a search algorithm would not search among all rectangular shapes, but would switch to the directory "windows" right away.

In the example shown herein there are provided a directory $A_1$ for high rectangular windows, a directory $A_2$ for wide rectangular windows and a directory $A_3$ for round or differently shaped windows. The directory $A_2$ likewise includes additional subgroups $A_{21}$ and $A_{22}$, which are related to different divisions of the window surface.

The exact relationships between height and width of the library elements according to the description in connection with FIG. 5 need not be fixed from the beginning, however. They may be changed at any time by variations, by stretching or shrinking the height and width. The logical differentiation between high and wide rectangular windows is, however, sensible in so far as, according to experience, certain window cross shapes are only used for certain window types.

Thus, the directory $A_1$ includes a subgroup $A_{11}$ for windows with a skylight, a subgroup $A_{12}$ for bipartite windows with a skylight, and a subgroup $A_{13}$ for bipartite windows with a bipartite skylight. The library elements of the respective subgroup are linked with attribute vectors which are characterized by different sets of parameters. Thus, for example, the attribute vectors of the subgroup $A_{11}$ do not comprise a parameter for the above-mentioned foot ratio because no window cross is provided.

The mathematical configuration of the attribute vector, i.e. the number of the parameters and components provided, accordingly represents the graphical construction of the library element. Expediently, the database for the library elements contains primarily data vectors and data fields, which are dimensioned in correspondence with the attribute vectors, but substantially no graphic representations or images of the library elements themselves. Graphically, the library elements are generated by corresponding program routines only when the corresponding partial areas of the generalized texture are generated.

Thus, the volume of the database can be kept very compact. Moreover, predefining the structure of the attribute vectors and some boundary conditions permits, for example, to represent the aforementioned directories of type $A_1$ and $A_2$ by one single configuration of the attribute vector, whereby the components of this attribute vector are varied in correspondence with the library elements contained in the directories or are assigned corresponding values, respectively.

It will be appreciated that according to the description of FIG. 5, a number of color models for the respective library elements are stored in any of the subdirectories, with an attribute vector with a corresponding set of parameters according to the preceding description being assigned to each individual library element. Moreover, also different library elements with different height/width ratios can be predefined in advance as fixed models with fixed characteristics. These fixed models with defined parameters in the attribute vectors may be used in a very rough and simple procedure for the standardized replacement of raw texture elements.

The directory T comprises library elements for doors. As per expedient definition, doors are all raw texture elements which are located in the area of a lower image edge or a lower edge of the three-dimensional virtual object or the raw texture, respectively. Exemplary subdirectories are formed by a directory $T_1$ for single doors and a directory $T_2$ for double doors.

Moreover, a directory for façade surfaces is provided. This directory substantially comprises fill patterns or fill images with different colors and structures, which are dimensioned according to a pattern recognition executed on the raw texture. Thus, for example, there is provided a directory $P_1$ for rough plaster and a directory $P_2$ for a clinker façade. The library elements stored in these directories are substantially bitmaps or other graphics files in which patterns are stored via defined brightness and color values, which are compared to given structures in the raw texture. In the simplest case, the area P contains a simple color palette with different color values, which are compared to colors on the raw texture.

The different subdirectories and the different library elements stored in the same, respectively, may also be combined. Thus, for example, a color surface of a library element A "window" can be filled with a color or a pattern from the subdirectory P "pattern", whereby a first routine determines according to the above description the shape and type of the library element "window", while a second routine determines and classifies the exact color or pattern structures from the raw texture. Therefore, it should be pointed out in this connection that the individual subdirectories and sections in the tree diagram of FIG. 6 may be assigned different classification routines.

Another domain of the library elements, which is not shown herein, is defined by simple decorative elements for façades, e.g. cornices, keystones, simple stucco elements etc., whose assignment to corresponding raw texture elements is substantially accomplished by a combination of shape recognition and scaling, as was already described in connection with the example shown in FIG. 5.

The replacement of raw texture elements by the library elements is accomplished by cutting them out and replacing them. This means that the area of the classified raw texture element in the raw texture is cut out and replaced by the library element. Here, it may be necessary that the library element has to be scaled in respect of its size.

Figure 7:
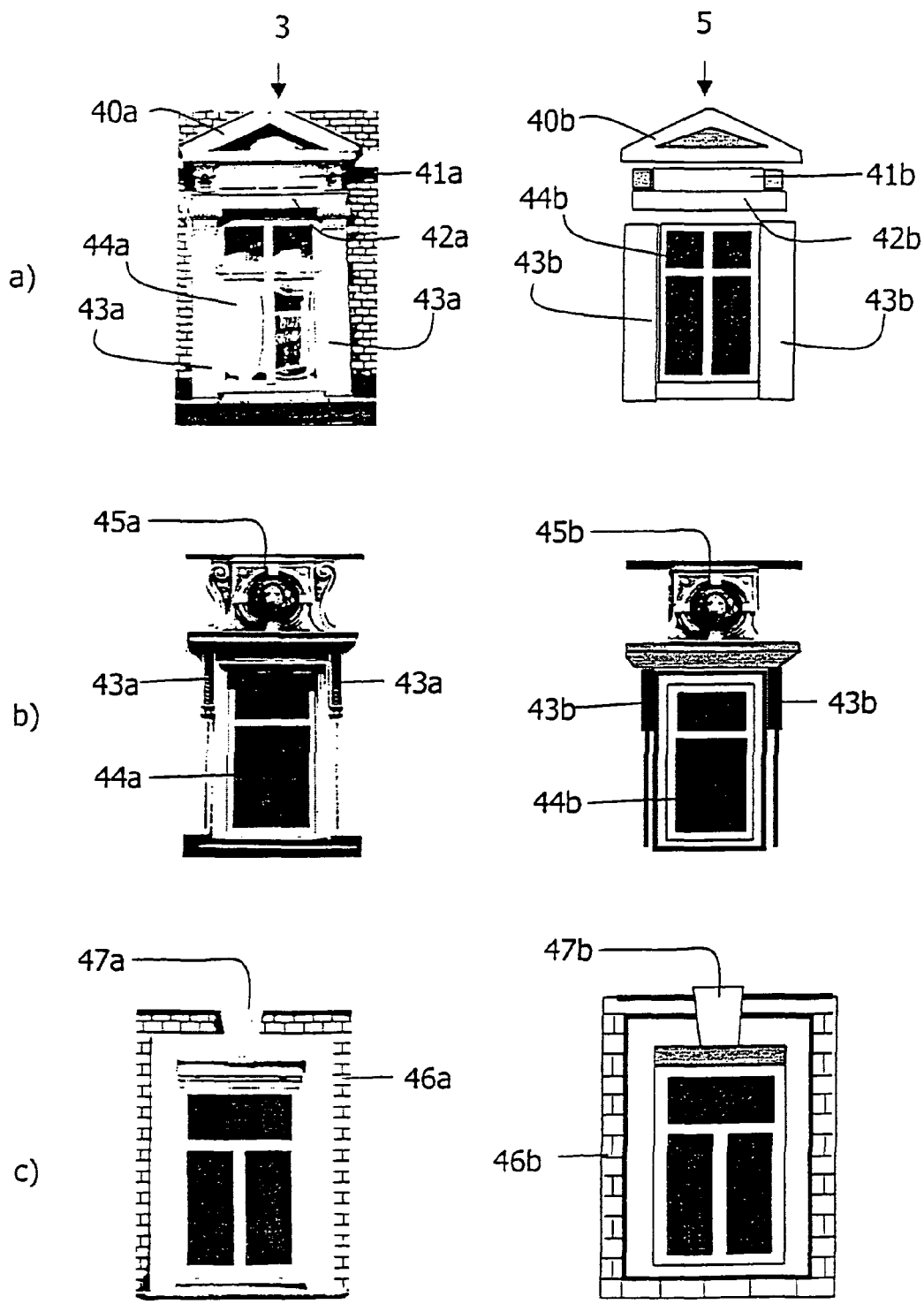
FIG. 7 shows replacements of raw texture elements by library elements by the example of some window shapes.

FIG. 7 shows some exemplary replacements of raw texture elements by library elements by the example of windows with façade decorations. The examples shown in FIG. 7 are to illustrate above all how the generated; generalized texture 5 is assembled from modules. The figure shows the raw textures on the left side and the generalized texture generated therefor on the right side. Example a) shows a window with a triangular stucco element 40*a*, a rectangular section 41*a* underneath the same and a window lintel 42*a*. Moreover, columnar flanks 43*a* are provided. The window surface 44*a* is formed of a window cross with a divided skylight.

In this example, the stucco element 40*a* in the generalized texture 5 is replaced by a triangle 40*b*, which is partly filled with a darker color so as to imitate the shadow structure of the stucco element 40*a*. Section 41*a* is replaced by a rectangle 41*b* enclosed by darker sections on the left and right. The window lintel 42*a* and the flanks 43*b* are also replaced by rectangles. According to the preceding description, a corresponding library element is used for the window surface 44*b*. The elements 40*b*, 41*b*, 42*b*, 43*b* and 44*b* now define the generalized texture 5 of the raw texture element in question, that is, of the window shown on the left.

In example b), the raw texture element comprises flanks 43*a* of a simpler design, and a window surface 44*a* only showing a transverse beam. In addition to these simple attributes, however, a decorative element 45*a* is provided, which shows a relatively complicated picture motif, in this example a lion's head.

This lion's head represents a non-classifiable element. This means that either its structure cannot be detected in an image recognition, or that no library element exists for its structure. In this case, the image area of the lion's head is transferred as bitmap 45*b* into the generalized texture illustrated on the right. Together with the library elements 43*b* and 44*b* the bitmap 45*b* forms the corresponding generalized texture in example b) of FIG. 7. This generalized texture simultaneously forms a mixture of one section of the raw texture element and multiple replacements by individual library elements. Thus, the raw texture element can be transferred into the generalized texture with sufficient exactness, with the attribute of the lion's head being preserved.

Example c) shows a raw texture element in the form of a window with an undecorated frame and a wedge-shaped keystone 47*a* in connection with a clinker façade 46*a*. In the generalized texture on the right the keystone is formed by a library element 47*b* in the form of a trapezoid. The clinker façade was classified in a pattern recognition and is replaced by a library element 46*b* with a corresponding fill structure "wall".

Specific combinations of individual library elements are combined and stored in special visualization libraries to allow a fast visualization/use of the textured models. A visualization library is here usable for one or more projects.

Figure 8:
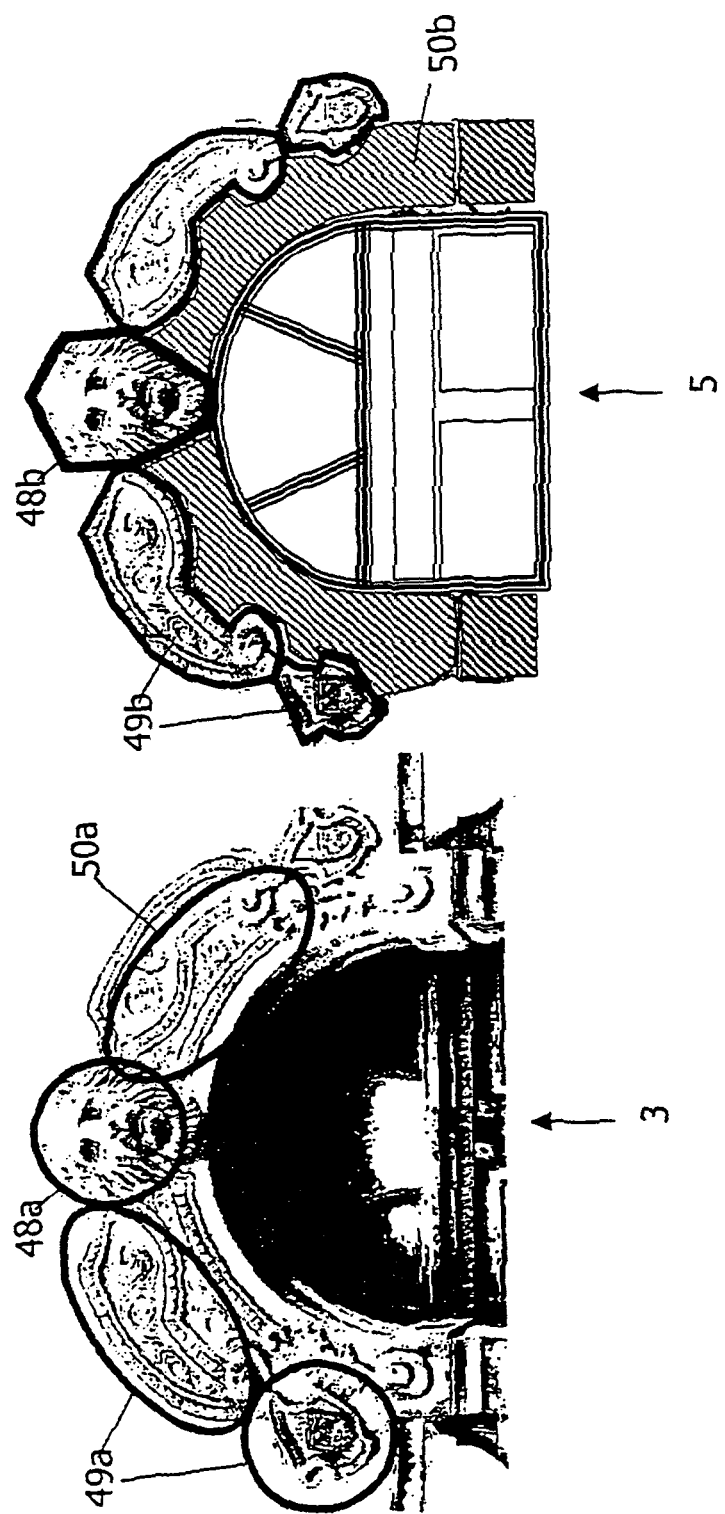
FIG. 8 shows replacements of non-classified raw texture structures by the example of stucco elements of a doorway arch.

FIG. 8 shows a final example for a treatment of non-classifiable structures in the raw texture. In this example, a doorway arch is shown, which comprises a lion's head as a first raw texture 48*a*, various ornaments 49*a* and 50*a*. The comparison with the generalized texture 5 shows that, in this example, the raw textures 48*a* and 49*a* were transferred into the generalized texture as bitmaps, while the raw texture 50*a* is a picture section provided with a uniform color filling and now forms a component 50*b* of the generalized texture. Such a treatment of non-classifiable raw texture structures is above all useful if extensive areas with memory-intensive picture element structures are not classifiable and if the transfer of these structures as bitmaps would therefore result in relatively complicated generalized textures. In this case, for example, a mean color or brightness value of the area in question can be determined and used as filling for the respective area of the generalized texture.

Instead of replacing each single façade element by an elementary library element, the method can be simplified significantly by tiling the virtual object. This always offers itself if highly periodic façade structures have to be reproduced, which is specifically the case with panelized building structures and apartment houses.

One reason for this approach results from the formal operating principle of standard visualization software and from the necessity to increase the visualization speed of the textured virtual object, because the textured model objects to be displayed in real-time have to be assembled in a dynamic process from the vector data of the building body and the addressed elements of the supplied library during the visualization.

Instead of the replacement of individual elementary library elements described above, a tile structure is generated from repeated library elements, which covers the total surface of the textured object. This particularly means that instead of the individual attributes, such as a window of type A and a façade color of type B, an adapted wall element is generated, which contains combined attributes of types A/B. By a cyclic repetition this combined element completely fills the textured surface. This procedure has proved to be very effective.

Of course, with all generated generalized textures, or during the generation of the generalized textures, respectively, a "manual" image postprocessing is possible, i.e. by using an image processing program, so as to compensate certain inaccuracies. To this end, the generalized texture is outputted in the form of a known image data format, whereby vectorized data formats allowing scalings are particularly expedient. Especially scalable SVG vector graphics have proved to be very suitable for this purpose.

The method was explained by means of embodiments. The person skilled in the art will appreciate that modifications to the illustrated embodiments may be made without departing from the fundamental idea of the invention. Other modifications and embodiments are particularly defined in the dependent claims.

LIST OF REFERENCE NUMBERS 1 façade picture
2 virtual three-dimensional object
3 raw texture element
4 library element
5 generalized texture
31 raw texture element first dormer window
32 raw texture element second dormer window
33 raw texture element first window
34 raw texture element second window
35 raw texture element third window
36 raw texture element with inhomogeneous structure
37 raw texture element, stucco
38 raw texture element, stucco
39 raw texture element, stucco
40a raw texture element, stucco element, triangular
40b library element, triangle filled with color
41a raw texture element, rectangular window lintel
41b library element, rectangular shape
42a raw texture element, window lintel
42b library element, rectangle
43a raw texture element, flank
43b library element, rectangle
44a raw texture element, window surface with window cross
44b library element, window surface with cross
45a raw texture, lion's head
45b transferred bitmap, lion's head in generalized texture
46a raw texture, clinker façade
46b library element, fill structure wall
48a raw texture lion
48b generalized texture, inserted bitmap
49a raw texture first ornament
49b generalized texture, inserted bitmap
50a raw texture second ornament
50b generalized texture, homogeneous color filling
b raw texture element, width
$h_1$ raw texture element, height
$h_2$ raw texture element, height transverse beam window cross
$v_1$ raw texture element, width/height ratio
$v_2$ raw texture element, transverse beam/total height ratio
$v_3$ raw texture element, foot ratio
$f_n$ raw texture element, color value different areas
m raw texture element, formal attribute vector
B library element, width
$H_1$ library element, height
$H_2$ library element, height transverse beam window cross
$V_1$ library element, width/height ratio
$V_2$ library element, transverse beam/total height ratio
$V_3$ library element, foot ratio
$F_n$ library element, color value different sections
M attribute vector, library element
$A_1$ directory high rectangular windows
$A_{11}$ windows with skylight
$A_{12}$ windows, bipartite with skylight
$A_{13}$ windows, bipartite, bipartite skylight
$A_2$ directory broad rectangular windows
$A_3$ directory round windows
T directory doors
$T_1$ single doors
$T_2$ double doors
$P_1$ structure directory rough plaster
$P_2$ structure directory clinker façade

What is claimed is:

1. Method for texturing a virtual three-dimensional object with a photographic image of a real object, the method comprising:
obtaining a photographic image;
projecting the photographic image onto a virtual surface of the virtual three-dimensional object to generate a raw texture;
localizing a raw texture element within the raw texture by using a classification method;
describing the localized raw texture element in a computerized manner by a formal attribute set for the raw texture element;
comparing the formal attribute set of the raw texture element with an attribute set of predetermined library elements and determining similarity measures between the raw texture element and a library element; and
replacing the localized raw texture element with at least one library element if a predefined similarity measure is present, wherein the raw texture is transformed into a generalized texture of the virtual object by replacing all localized raw texture elements with library elements.

2. Method according to claim 1, wherein the projected photographic image for generating the raw texture is obtained from a georeferenced terrestrial digital photograph.

3. Method according to claim 1, wherein the projected photographic image is obtained from one of a nadir aerial photograph and an oblique aerial photograph.

4. Method according to claim 1, further comprising image processing to improve the image by removing faults in the raw texture, specifically a reduction and/or elimination of disadvantageous shadow edges and blurrings by means of suited methods.

5. Method according to claim 1, wherein the classification method for localizing the raw texture element includes a detection of position, shape, color, surface and/or edge according to previously defined search parameters, whereby the localized raw texture element is selected at least in view of its position, shape, color, surface and/or edge structure and the like attributes.

6. Method according to claim 1, wherein if the attributes of the raw texture element, particularly a height and width and/or a picture element number, are scaling-dependent, the raw texture element is rescaled to a normalized reference quantity and the normalized reference quantity forms a part of the formal attribute set of the raw texture element.

7. Method according to claim 1, wherein scaling-independent attributes of the raw texture element, particularly color values, define an absolute reference quantity in the formal attribute set of the raw texture element.

8. Method according to claim 6, wherein the comparison of the formal attribute set of the raw texture element with the attribute set of a library element includes a comparison of the normalized reference quantities, wherein similarity is determined when a ratio between two attributes of the formal attribute set is invariant relative to a ratio between the corresponding two attributes of the attribute set of the library element.

9. Method according to claim 7, wherein the comparison of the formal attribute set of the raw texture element with the attribute set of a library element includes a comparison of the absolute reference quantities, whereby a test for a greatest possible correspondence of the absolute reference quantities is carried out.

10. Method according to claim 8, wherein in the determination of the similarity measure a degree of correspondence of the absolute reference quantities and a stability of the invariant ratio is evaluated.

11. Method according to claim 1, wherein the similarity measure is defined in advance, with all library elements being outputted as selection alternatives for the raw texture element with a similarity measure lying within a tolerance range.

12. Method according to claim 1, wherein the replacement of the localized raw texture element with the library element is accomplished by cutting the point set of the raw texture element out of the raw texture and inserting the point set of the at least one library element into the raw texture.

13. Method according to claim 12, wherein the replacement includes a manual postprocessing step.

14. Method according to claim 1, wherein non-classified sections of the raw texture are inserted into the generalized texture as pixel groups, particularly bitmaps.

15. Method according to claim 1, wherein during the transformation of the raw texture into the generalized texture a tiling of the virtual object is carried out at least partially by a repeated insertion of an adapted library element.

16. Method according to claim 2, wherein image processing steps are carried out to improve the image by removing faults in the raw texture, specifically a reduction and/or elimination of disadvantageous shadow edges and blurrings by means of suited methods.

17. Method according to claim 3, wherein image processing steps are carried out to improve the image by removing faults in the raw texture, specifically a reduction and/or elimination of disadvantageous shadow edges and blurrings by means of suited methods.

18. Method according to claim 5, wherein for attributes of the raw texture element that are scaling-dependent, the raw texture element is rescaled to a normalized reference quantity and the normalized reference quantity forms a part of the formal attribute set of the raw texture element.

19. Method according to claim 5, wherein color value attributes of the raw texture element define an absolute reference quantity in the formal attribute set of the raw texture element.

* * * * *

UNITED STATES PATENT AND TRADEMARK OFFICE
CERTIFICATE OF CORRECTION

PATENT NO.       : 8,705,843 B2                                      Page 1 of 1
APPLICATION NO. : 12/311684
DATED            : April 22, 2014
INVENTOR(S)      : Peter Lieckfeldt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Twenty-ninth Day of September, 2015

Michelle K. Lee
*Director of the United States Patent and Trademark Office*